July 2, 1968          J. C. JUREIT          3,390,902
WOOD JOINT AND CONNECTOR THEREFOR
Original Filed Jan. 10, 1963          2 Sheets-Sheet 1
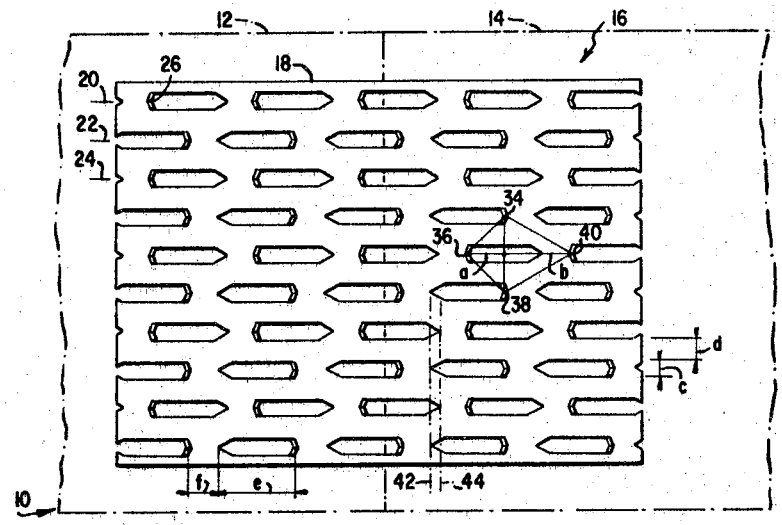
FIG.1
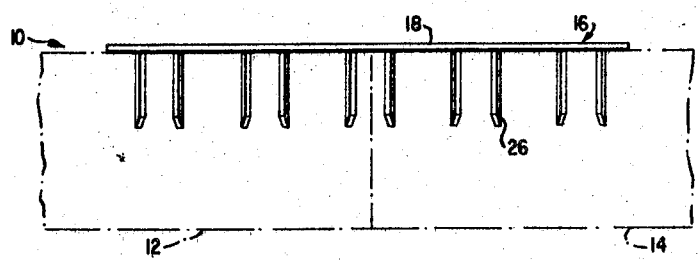
FIG.2
FIG.5
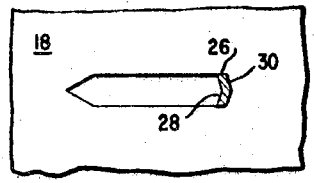
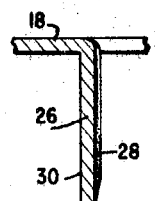
FIG.3
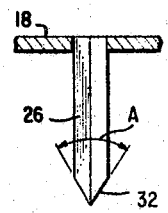
FIG.4
FIG.8
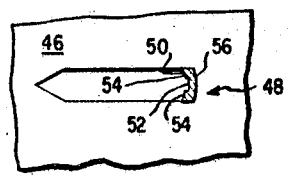
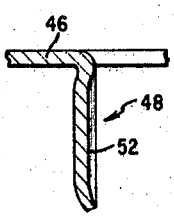
FIG.6
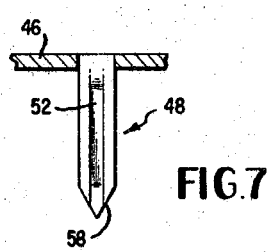
FIG.7
INVENTOR.
JOHN C. JUREIT
BY
*Le Blanc and Shur*
ATTORNEYS July 2, 1968          J. C. JUREIT          3,390,902

WOOD JOINT AND CONNECTOR THEREFOR

Original Filed Jan. 10, 1963          2 Sheets-Sheet 2

INVENTOR
JOHN C. JUREIT

BY *Le Blanc and Shur*

ATTORNEYS

United States Patent Office 3,390,902
Patented July 2, 1968

3,390,902
WOOD JOINT AND CONNECTOR THEREFOR
John C. Jureit, Coral Gables, Fla., assignor to Automated Building Components, Inc., Miami, Fla., a corporation of Florida
Continuation of application Ser. No. 486,594, Aug. 31, 1965, which is a continuation of applications Ser. No. 293,946, July 10, 1963, and Ser. No. 250,663, Jan. 10, 1963. This application Apr. 8, 1966, Ser. No. 541,345
7 Claims. (Cl. 287—20.92)

ABSTRACT OF THE DISCLOSURE

A wood joint and connector for structural wood joints such as are formed in roof trusses. The plate is formed of lighter gauge metal such as 18 U.S. Standard Gauge and this is made possible by a novel tooth pattern and configuration to provide more teeth per square inch of plate surface without, at the same time, unduly weakening the plate or causing the teeth to bend when driven into the denser lumber. In one embodiment the teeth are of different length to enhance penetration of the lumber by the teeth.

---

This application is a combined continuation of copending applications Ser. No. 486,594, filed Aug. 31, 1965 and Ser. No. 293,946, filed July 10, 1963, both of which are now abandoned. Application S.N. 486,594 was in turn a continuation of the then copending application Ser. No. 250,663 filed Jan. 10, 1963, now abandoned.

This invention relates to metal connectors, structural wood joints, and more particularly relates to connectors and joints of the butt type used in prefabricated wooden structures such as roof trusses. It is particularly concerned with the provision of a lighter gauge plate than heretofore thought necessary for structural joints. The tooth arrangement and configuration disclosed make it possible to provide more teeth per square inch of plate surface without weakening the plate or otherwise adversely affecting the strength of the joint. Enhanced tooth penetration is brought about by providing teeth of different lengths.

For many centuries mankind has been concerned with the problem of properly joining structural load bearing wooden members. In more recent years, with the advent of various types of prefabrication, structural wooden joints have been developed, which are connected solely by means of metal plates having slender, elongated, nail-like teeth, struck therefrom and embedded in the wooden members. A joint of this type is illustrated in Jureit Patent No. 2,877,520. Similar joints of this same type are shown in Menge Patent No. 3,011,226, and Atkins Patent No. 3,016,586. The plates of this type which have been used to date, wherein the teeth of the plates serve as the only means holding the plates onto the wooden members, have been formed of sheet steel of a thickness of at least 16 U.S. standard gauge, (nominal thickness .0598 inch). The vast majority have been of a thickness of 14 U.S. standard gauge (nominal thickness .0747 inch).

According to the present invention it has now been found that by using an even thinner metal, such as 18 U.S. standard gauge, (nominal thickness .0478 inch) in conjunction with a unique combination of tooth shape and disposition of teeth on the plate, a considerable saving in joint cost can be effected. It has been further found that this reduction in cost can be achieved without sacrificing adequate structural strength in the joint. Thus, with joints constructed according to the present invention, the amount of metal per joint is very considerably reduced as compared to that necessary with the older, heavier plates, but without any impairment of the strength or utility of the joints. While the plate and joint of the present invention have broad utility in structural load bearing elements, their most common use lies in the field of residential home construction, and most particularly, in the manufacture of roof trusses for houses.

In certain instances where plates of the type herein disclosed have been used in large sizes to form joints between heavier members, such as for instance 2 x 10's or 2 x 12's, it has been found that the normal plate pressing operation does not always result in full driving of the teeth into the wooden members. While the use of additional pressure in embedding the plates is helpful in some situations, it does not provide a complete solution, but leaves a certain number of instances in which complete embedding of all the teeth is not secured.

According to the present invention it has now been found that this problem with 18 gage plates may be substantially eliminated in even the more dense woods customarily used in residential construction in the United States, through a unique disposition of the teeth in the plates. Thus, according to the present invention, 18 or similar gage connector plates are formed with teeth of varying length with the teeth of different lengths substantially uniformly disposed over the entire area of the plate, and particularly over the center portion. That is to say, according to a modified embodiment of the present invention, at least the central portion of the connector plate is provided with teeth of two lengths, with the number of teeth of one length being substantially equal to the number of teeth of the other length, with the teeth of each length being substantially uniformly disposed over at least the central portion of the plate. When this is done it is found that complete insertion of all teeth may be accomplished without resort to unusually high insertion pressures.

It is accordingly a primary object of the present invention to provide improved structural load bearing wooden joints and connectors therefor.

It is another object of the invention to provide improved structural load bearing wooden joints and connectors therefor which are less expensive than previously available joints and connectors.

It is another object of the present invention to provide improved structural load bearing wooden joints and connectors therefor which provide a joint strength per unit of metal in the joint which is considerably in excess of that previously available.

It is still another object of the present invention to provide improved structural load bearing wooden joints and connectors therefor which provide uniformly complete insertion of the teeth into even the more dense woods customarily used in residential construction in the United States.

These and further objects and advantages of the invention will become more apparent upon reference to the following specifications, claims and appended drawings, wherein;

FIGURE 1 is a plan view of a connector and joint constructed according to the present invention;

FIGURE 2 is a side elevation of the joint of FIGURE 1;

FIGURE 3 is a vertical section through one of the teeth of the connector of FIGURE 1;

FIGURE 4 is a front elevation of one of the teeth of the connector of FIGURE 1;

FIGURE 5 is a plan view of a portion of the connector of FIGURE 1 showing a tooth in horizontal cross section;

FIGURE 6 is a vertical section through another embodiment of a tooth for use with a connector of the type shown in FIGURE 1;

FIGURE 7 is a front elevation of a tooth of the type shown in FIGURE 6;

FIGURE 8 is a plan view of a portion of the plate embodying a tooth of the embodiment of FIGURES 6 and 7 showing a horizontal tooth cross section;

Figure 9:
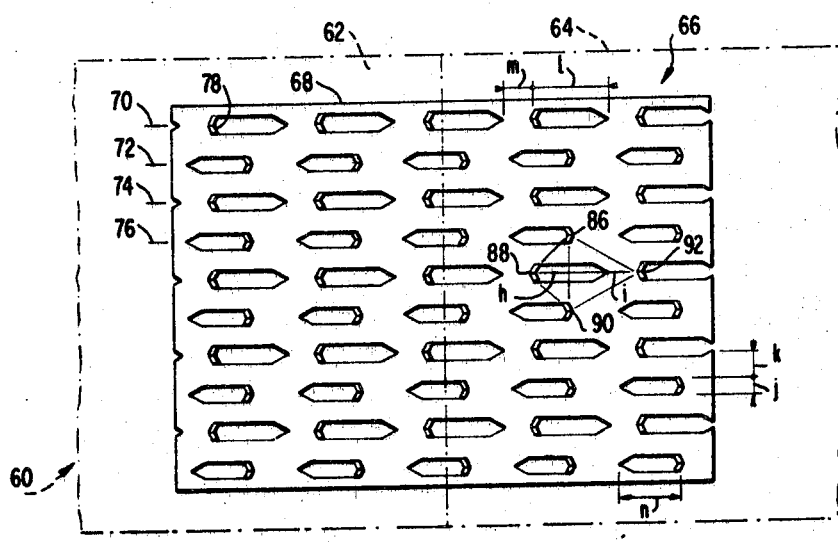
FIGURE 9 is a plan view of a connector and joint constructed according to a modified embodiment of the present invention.

Referring more particularly to FIGURES 1 and 2, there is shown, generally indicated at 10, a structural butt joint comprising a pair of structural load bearing members shown in phantom at 12 and 14 which are fastened together by a connector generally indicated at 16. The connector 16 comprises a steel plate 18 having struck therefrom a plurality of rows 20, 22 and 24 of slender, elongated nail-like teeth 26 which leave rows of elongated slots. The teeth 26 are embedded in the wooden members 12 and 14 in any suitable manner, preferably by the application of pressure to the plate 18 by a suitable press. While only a single plate is shown in FIGURE 2, it is to be understood that two plates may be used, with one plate on each side of the wooden members with the teeth in the opposed plates extending towards one another within the wooden members.

Referring to FIGURES 3, 4 and 5, each tooth 26 is generally V-shaped in cross section (as best seen in FIG. 5) and has a concave punch face 28, which is formed by the punch in the connector manufacturing operation, and a convex back face 30. In order to obtain the advantages of the present invention, the teeth must terminate in pointed ends or tips of reduced cross section, which are shown in FIGURE 4 as chisel pointed tips 32 with an angle A between the chisel surfaces which is preferably no greater than 60 degrees. While other types of pointed ends or tips may be utilized, such as scarf-pointed ends or rounded points, the chisel points shown in the drawings are to be preferred.

According to the present invention an unusually high ratio of joint strength per unit weight of metal utilized in the joint has been obtained through the utilization of a higher tooth density, then has heretofore been thought possible without causing undue splitting of the wooden members which would cause a decrease in joint strength and erratic joint performance. Thus, there are no less than approximately three teeth per square inch of the plate surface and preferably 4.5. This high density of teeth in itself has become possible only through the particular arrangement of teeth which was itself discovered only after long experimentation. The unusual tooth arrangement which was thus discovered, and the relationships to be presently discussed have been found to be empirical in nature so that the high strength per unit weight of metal connector which is obtained cannot be explained or predicted by terms of precise mathematical formulae.

According to the invention, the teeth in adjacent rows such as rows 20 and 22 in FIGURE 1, are struck in opposite directions to provide teeth which fall in groups of three's, such as the groups comprising teeth 34 and 36 and 38, teeth 34 and 38 of which also form a second group of three, comprising teeth 34, 38 and 40. It will be seen that the teeth 34, 36 and 38 whose punch faces 28 face towards one another, lie at the corners of a triangle having an altitude $a$. Similarly, the teeth 34, 38 and 40 whose back faces 30 face one another, lie at the corners of a triangle having an altitude $b$. According to a specific and preferred embodiment of the invention, the altitude $a$ is ¼ inch while the altitude $b$ is $17/32$ inch. The distance between adjacent teeth in one row, namely the altitude $a$ plus the autitude $b$ is $25/32$ inch. The ratio of $b/a$ in this particular embodiment is 2.124 and preferably should be no less than 2. When this arrangement is provided it will be noted that the pointed ends or tip portions of the slots are substantially in register transversely across the connector, as indicated by the broken lines 32 and 34 in FIGURE 1, such that a line can be drawn transversely across the plate which contacts the tip portion of a slot in each row. In this specific preferred embodiment, the width of the slots indicated at $c$ in FIGURE 1, and therefore the nominal width of the teeth, is ⅛ inch while the spacing between the edges of adjacent slots, indicated at $d$ in FIGURE 1 is .1565 inch. The ratio of $d/c$ is thus 1.25. This ratio has been found to be an approximate minimum below which wood might split and joint strength is deleteriously effected. Exceeding this ratio introduces additional metal into the joint which has been found unnecessary for an optimum strength per unit weight of metal in the connector.

According to the specific preferred embodiment illustrated in FIGURES 1 and 2, the length of the teeth indicated at $e$ is $9/16$ inch while the spacing between the end of the slot and the adjacent tooth, indicated at $f$, is $7/32$ inch. The ratio of $e/f$ is therefore 2.57 and is preferably not less than 2. The length of the teeth is also related to the thickness of the plate, which, in the preferred specific embodiment, is 18 gage plate having a nominal thickness when galvanized of .0510 inch. Such plate is normally provided within the tolerances of .0486 inch minimum and .0533 inch maximum thickness. The use of thin plate is essential to the cost advantage resulting from the unusual high strength per unit weight of metal ratio obtainable through the invention and therefore a plate thickness of no greater than approximately .0533 inch is desirable. The ratio of tooth length to plate thickness in the preferred specific embodiment is approximately 11 and should not be less than 8.

It will be seen that with a connector constructed according to the preferred specific embodiment any line drawn transversely across the connector perpendicular to the rows of slots, other than a line through a transverse row of teeth, will intersect at least those rows of slots extending in one direction, and a line drawn transversely across said plate perpendicular to said slots and through the altitude $a$ in the triangle 34, 36, 38 or any similar triangle, will intersect all of said rows of slots.

While the teeth shown in the embodiment of the invention illustrated in FIGURES 1–5 have a generally V-shaped cross section, it is possible to provide other arcuate cross sections. An example of a tooth formed in one such manner is illustrated in the embodiment of the invention shown in FIGURES 6–8. Referring to those figures, there is seen a plate 46 from which a tooth generally indicated at 48 is struck. The tooth 48 has its punch side 50 formed with a central groove 52. A pair of inclined surfaces 54 lie at each side of the groove 52 and the back surface 56 of the tooth is generally arcuate. The tooth is provided with a tip or point 58 of the chisel type similar to that found in the embodiment of the invention illustrated in FIGURES 1–5. As in the preceding embodiment of the invention, the curvate cross section of the tooth provides rigidity.

Actual tests show that when forming structural butted wooden joints with the connectors of FIGURES 1–8, it is possible to achieve a considerable increase both in longitudinal tensile and transverse withdrawal strength per unit weight of metal utilized in the joint. This makes it possible to form joints with the same strength as prior joints while utilizing a considerably smaller amount of metal and thereby concomitantly reducing the cost of the joint. The device of the invention thereby makes it possible to prefabricate structural wooden members, such as roof trusses, at a lower cost than heretofore possible.

Figure 10:
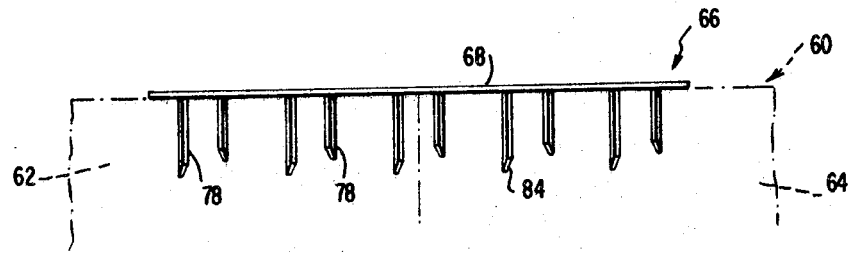
FIGURE 10 is a side elevation of the joint of FIGURE 9.

According to the embodiment of the invention illustrated in FIGURES 9 and 10 there is shown, generally indicated at 60, a structural butt joint comprising a pair of structural load bearing wooden members shown in phantom at 62 and 64 which are fastened together by a connector generally indicated at 66. The connector 66 comprises a mild steel plate 68 having struck therefrom a plurality of rows 70, 72, 74 and 76 of slender, elongated nail-like teeth 78 which leave rows of elongated slots.

The teeth 78 are embedded in the wooden members 62 and 64 in any suitable manner, preferably by the application of pressure to the plate 68 by a suitable press. While only a single plate is shown in FIGURE 10, it is to be understood that two plates may be used, with one plate on each side of the wooden members with the teeth in the opposed plates extending towards one another within the wooden members.

Each tooth 78 is of generally V-shaped cross section but any of the tooth shapes described above for the preferred embodiment of FIGURES 1–8 may also be used for the plate and joint of FIGURES 9 and 10.

The teeth in adjacent rows such as rows 70 and 72 in FIGURE 9 are struck in opposite directions to provide teeth which fall in groups of three's, such as the group comprising teeth 86, 88 and 90, teeth 86 and 90 of which also form a second group of three, comprising teeth 86, 90 and 92. It will be seen that the teeth 86, 88 and 90 whose punch faces 80 face towards one another, lie at the corners of a triangle having an altitude $h$. Similarly, the teeth 86, 90 and 92, whose back faces 82 face one another, lie at the corners of a triangle having an altitude $i$. According to a specific embodiment the altitude $h$ is ¼ inch while the altitude $i$ is $17/32$ inch. The distance between adjacent teeth in one row, namely the altitude $h$ plus the altitude $i$ is $25/32$ inch. The ratio of $i/h$ in this particular embodiment is 2.124. In this embodiment the width of the slots indicated at $j$ in FIGURE 9, and therefore the nominal width of the teeth, is ⅛ inch while the spacing between the edges of adjacent slots, indicated at $k$ in FIGURE 9 is .1565 inch. The ratio $k/j$ is thus 1.25. This ratio has been found to be an approximate minimum below which wood might split and joint strength is deleteriously affected. Exceeding this ratio introduces additional metal into the joint which has been found unnecessary for an optimum strength per unit weight of metal in the connector.

In the embodiment of the invention as illustrated in FIGURES 9 and 10 alternate rows of teeth 72 and 76 are shorter than rows 70 and 74 with the difference in length preferably being approximately ⅛ inch. Where the difference in length is too small, the previously mentioned difficulties in fully embedding the teeth are not alleviated to a satisfactory extent. Where the difference in length is too great, the shorter teeth tend to develop an unsatisfactory withdrawal resistance. While it would be theoretically feasible to use the short teeth primarily as shear teeth this generally reduces the total withdrawal resistance of the connector plate to the point where its resistance to racking stresses is questionable. Indeed, it is a feature of the invention that even the shorter teeth are slender, elongated and nail-like so as to develop significant withdrawal resistance.

According to a specific preferred embodiment of the invention illustrated in FIGURES 9 and 10, the length of the long teeth indicated at $l$ is $9/16$ inch while the length of the short teeth indicated at $n$ is $7/16$ inch. The spacing between the end of the slot and the adjacent long tooth indicated at $m$ is $7/32$ inch. The ratio of $l/m$ is therefore 2.57 and is preferably not less than 2. The length of the teeth is also related to the thickness of the plate, which, in the preferred specific embodiment is 18 gage plate having a nominal thickness when galvanized of .0510 inch. The use of thin plate is essential to the cost advanage resulting the unusual high strength per unit weight of metal ratio obtainable through the invention and therefore a plate thickness of no greater than approximately .0533 inch is desirable. The ratio of long tooth length to plate thickness in the specific embodiment of FIGURES 9 and 10 is approximately 11 and should not be less than 8. The ratio of short tooth length to plate thickness in this embodiment is approximately 8.5 and should not be less than 6.

With the uniformly disposed short and long teeth used in the connectors and joints of FIGURES 9 and 10 it is found that uniformly complete tooth insertion is obtained without resorting to other than standard methods of pressing the teeth into the wood. It is particularly important that both long and short teeth be provided in the central area of the plate in substantially uniform distribution since experimentation has shown that it is in the central area of the plate in substantially uniform distribution likely to be most severe. Indeed, such difficulties are seldom, if ever, encountered at the very edges of the plate. While it would be possible to obtain substantially the full advantages of the invention through the use of varying length teeth uniformly disposed over only the interior portions of the connector plates, economical manufacturing methods make it desirable to make the tooth distribution uniform over the entire plate. Further, while it is stated that the central portion of the connector plates is most critical, only the outermost row of teeth can be said to be completely free from the problem which the long-short tooth pattern solves.

While the embodiment of FIGURES 9 and 10 has been described in connection with teeth of two lengths, it will be apparent to those skilled in the art that it is not limited to a situation where the teeth are either one length or the other, i.e. it is feasible within the purview of the invention to use teeth of three or even more different lengths.

The invention may be embodied in either specific forms without departing from the spirit or essential characteristics thereof. The present embodiments are therefore to be considered in all respects as illustrative, and not restrictive, the scope of the invention being indicated by the appended claims rather than by the foregoing description, and all changes which come within the meaning and range of equivalency of the claims are therefore to be intended to be embraced therein.

What is claimed and desired to be secured by United States Letters Patent is:

1. A connector for transmitting a structural load between butted wooden members comprising a plate having a plurality of slender, elongated nail-like teeth struck from a surface thereof to leave a plurality of slots lying generally along substantially parallel rows, said teeth extending substantially perpendicularly from one side of said plate and being integrally joined to said plate at one end of their respective slots with the shape of said slots defining the final peripheral configuration of said teeth, said teeth each having tips on their ends of reduced cross section including opposed side edges diverging in the direction of said plate for initial penetration of said wooden members, said tooth tips leaving corresponding tip portions in said slots which portions occur at the same corresponding end of the slots in a given row and at the opposite ends of the slots in the adjacent row on each side of said given row, the slots in said given row overlapping a corresponding slot in the other two rows such that the teeth of said given row are aligned in a direction transverse to said rows with a point intermediate the ends of the corresponding slots in said adjacent two rows, said tip portions of the slots in each of said three rows being substantially aligned such that a line drawn across said plate transverse to said rows contacts the tip portion of a slot in each of said rows, the teeth of said three rows being staggered so that the most closely spaced teeth in said three rows are two outermost teeth having their punch faces facing in one direction and a center tooth having its punch face facing in the opposite direction whereby said three teeth form a first triangle having a base extending between said two outermost teeth across the slot of said center tooth, a second center tooth of the same row as said first center tooth and immediately adjacent the tip portion of the slot from said first center tooth, said outermost teeth and said second center tooth forming a second triangle having the same base as said first triangle, with a line extending between said first and second center teeth intersecting said common base such that the portion of said line between said base and said second center tooth is at least twice the length of the portion of the said line between said base and said first center tooth, said second center tooth also forming the first center tooth in another group of four similarly related teeth, said teeth and slots being so disposed that a line drawn across said plate parallel to said triangle base and through any of said first portions of said lines between said first center teeth and said base of said triangles intersects slots in all three of said rows, said teeth and rows of slots being repeated over the surface of said plate.

2. A connector according claim 1 wherein certain of said nail-like teeth are substantially shorter than the remaining nail-like teeth, the shorter and longer nail-like teeth each being substantially uniformly distributed over at least the central portion of said plate.

3. A connector for transmitting a structural load between butted wooden members comprising a plate having a plurality of slender, elongated nail-like teeth struck from a surface thereof to leave parallel slots disposed substantially along parallel lines which are parallel to the longitudinal axis of the plate, said teeth extending substantially perpendicularly from one side of said plate and being integrally joined to said plate at one end of their respective slots with the shape of said slots defining the final peripheral configuration of said teeth, said teeth having a curvate cross section and extending away from said plate perpendicular thereto, said teeth having a punch face facing the direction of its slot and a back face facing in the opposite direction and terminating in tooth tips of reduced cross section including opposed side edges diverging in the direction of said plate for initial penetration of said wooden members, the slots in a given row extending away from their respective teeth in a first direction and terminating in a tip portion left by said tooth tips, the slots in the row on each side of said given row extending from their respective teeth in a direction opposite to said first direction and also terminating in tip portions left by said tooth tips, the slots in said given row overlapping a corresponding slot in the other two rows such that the teeth of said given row are aligned in a direction transverse to said rows with a point intermediate the ends of the corresponding slots in said adjacent two rows, said tip portions of the slots in each of said three rows being substantially aligned such that a line drawn across said plate transverse to said rows contacts the tip portion of a slot in each of said rows, the teeth of said three rows being staggered so that the most closely spaced teeth in said three rows are two outermost teeth having their punch faces facing in one direction and a center tooth having its punch face facing in the opposite direction whereby said three teeth form a first triangle having a base extending between said two outermost teeth across the slot of said center tooth, a second center tooth of the same row as said first center tooth and immediately adjacent the tip portion of the slot from said first center tooth, said outermost teeth and said second center tooth forming a second triangle having the same base as said first triangle, with a line extending between said first and second center teeth intersecting said common base such that the portion of said line between said base and said second center tooth is at least twice the length of the portion of the said line between said base and said first center tooth, said second center tooth also forming the first center tooth in another group of four similarly related teeth, said teeth and slots being so disposed that a line drawn across said plate parallel to said triangle base and through any of said first portions of said lines between said first center teeth and said base of said triangles intersects slots in all three of said rows, said teeth and rows of slots being repeated over the surface of said plate.

4. A connector according to claim 3 wherein said plate is cut off along lines intersecting slot tip portions at each end of at least one of said rows.

5. A structural joint for bearing a structural load comprising a pair of butted wooden members fastened together solely by means of at least one plate having a plurality of slender, elongated nail-like teeth struck from a surface to leave a plurality of slots lying generally along substantially parallel rows, said teeth extending substantially perpendicularly from one side of said plate and being integrally joined to said plate at one end of their respective slots with the shape of said slots defining the final peripheral configuration of said teeth, said teeth each having tips on their ends of reduced cross section including opposed side edges diverging in the direction of said plate for initial penetration of said wooden members, said tooth tips leaving corresponding tip portions in said slots which portions occur at the same corresponding end of the slots in a given row and at the opposite ends of the slots in the adjacent row on each side of said given row, the slots in said given row overlapping a corresponding slot in the other two rows such that the teeth of said given row are aligned in a direction transverse to said rows with a point intermediate the ends of the corresponding slots in said adjacent two rows, said tip portions of the slots in each of said three rows being substantially aligned such that a line drawn across said plate transverse to said rows contacts the tip portion of a slot in each of said rows, the teeth of said three rows being staggered so that the most closely spaced teeth in said three rows are two outermost teeth having their punch faces facing in one direction and a center tooth having its punch face facing in the opposite direction whereby said three teeth form a first triangle having a base extending between said two outermost teeth across the slot of said center tooth, a second center tooth of the same row as said first center tooth and immediately adjacent the tip portion of the slot from said first center tooth, said outermost teeth and said second center tooth forming a second triangle having the same base as said first triangle, with a line extending between said first and second center teeth intersecting said common base such that the portion of said line between said base and said second center tooth is at least twice the length of the portion of the said line between said base and said first center tooth, said second center tooth also forming the first center tooth in another group of four similarly related teeth, said teeth and slots being so disposed that a line drawn across said plate parallel to said triangle base and through any of said first portions of said lines between said first center teeth and said base of said triangles intersects slots in all three of said rows, said teeth and rows of slots being repeated over the surface of said plate.

6. A joint according to claim 5 wherein a first group of said nail-like teeth are approximately ⅛ inch shorter than a second group of said nail-like teeth, the teeth of each group being substantially uniformly distributed over at least the central portion of said plate.

7. A structural joint for bearing a structural load comprising a pair of butted wooden members fastened together solely by means of at least one plate having a plurality of slender elongated nail-like teeth with pointed ends struck therefrom to leave a plurality of substantially parallel rows of pointed slots with said teeth being joined to said plate at one end of their respective slots, the shape of the slots defining the final peripheral configuration of said teeth, the points of the slots in adjacent rows being directed in opposite directions, said teeth being imbedded in said wooden members and having a curvate cross section and extending away from said plate substantially perpendicular thereto, and said teeth being so disposed that there are no less than approximately three teeth per square inch of plate surface, certain of said nail-like teeth being shorter than the remaining nail-like teeth, the shorter and longer nail-like teeth being substantially uniformly distributed over at least the central portion of said plate, each tooth having a punch face facing the direction of its slot and a back face facing in the opposite direction, the teeth on adjacent rows being staggered so that in any three adjacent rows the most closely spaced teeth are two outermost teeth having their punch faces facing in one direction, and a center tooth having its punch face facing in the opposite direction, said three teeth forming a first triangle having a base perpendicular to said slot and an altitude extending along the slot from said center tooth, a second center tooth in the same row as said first center tooth and immediately adjacent the pointed end of the slot from said first center tooth, said outermost teeth and said second center tooth forming a second triangle having the same base as said first triangle and having an altitude which is colinear with the altitude of said first triangle, the altitude of said second triangle being greater than the altitude of said first triangle.

References Cited

UNITED STATES PATENTS

| | | | |
|---|---|---|---|
| D. 202,925 | 11/1965 | Mort | 85—13 |
| 272,685 | 2/1883 | Hart | 85—11 |
| 1,593,408 | 7/1926 | Honigbaum | 85—11 |
| 2,844,852 | 7/1958 | West | 85—13 |
| 3,016,586 | 1/1962 | Atkins | 85—13 |
| 3,172,171 | 3/1965 | Knight | 85—13 |
| 3,298,151 | 1/1967 | Jureit | 85—13 |
| 3,090,088 | 5/1963 | Foley et al. | 85—13 |

FOREIGN PATENTS

| | | |
|---|---|---|
| 63,390 | 7/1892 | Germany. |

CARL W. TOMLIN, *Primary Examiner.*

EDWARD C. ALLEN, *Examiner.*

RAMON S. BRITTS, *Assistant Examiner.*

UNITED STATES PATENT OFFICE
CERTIFICATE OF CORRECTION

Patent No. 3,390,902                                                        July 2, 1968

John C. Jureit

It is certified that error appears in the above identified patent and that said Letters Patent are hereby corrected as shown below:

Column 5, line 65, after "resulting" insert -- in --. Column 6, line 7, "area" should read -- areas --; same line 7, "in substantially uniform distri-" should read -- where insertion difficulties are --. Column 7, line 13, after "according" insert -- to --.

Signed and sealed this 24th day of February 1970.

(SEAL)
Attest:

Edward M. Fletcher, Jr.                           WILLIAM E. SCHUYLER, JR.
Attesting Officer                                          Commissioner of Patents